(12) United States Patent
Maurer et al.

(10) Patent No.: US 7,363,133 B2
(45) Date of Patent: Apr. 22, 2008

(54) LANE DETECTION SYSTEM AND METHOD

(75) Inventors: Cornelia Maurer, Besigheim (DE); Heinrich Gotzig, Heilbronn (DE)

(73) Assignee: Valeo Schalter und Sensoren GmbH (DE)

( * ) Notice: Subject to any disclaimer, the term of this patent is extended or adjusted under 35 U.S.C. 154(b) by 0 days.

(21) Appl. No.: 11/849,315

(22) Filed: Sep. 3, 2007

(65) Prior Publication Data

US 2007/0294010 A1    Dec. 20, 2007

Related U.S. Application Data

(63) Continuation of application No. PCT/EP2006/001131, filed on Feb. 9, 2006.

(30) Foreign Application Priority Data

Mar. 21, 2005    (DE) .................... 10 2005 014 114

(51) Int. Cl.
*G05D 1/00*    (2006.01)

(52) U.S. Cl. ........................................ 701/41; 382/107

(58) Field of Classification Search .................... 701/1, 701/36, 41, 70, 93, 300, 301; 180/169–179; 382/104–107; 340/901, 903
See application file for complete search history.

(56) References Cited

U.S. PATENT DOCUMENTS

| | | | | |
|---|---|---|---|---|
| 7,236,884 B2 * | 6/2007 | Matsumoto et al. | ........ | 701/300 |
| 7,266,436 B2 * | 9/2007 | Shirato et al. | ................ | 701/70 |
| 7,295,683 B2 * | 11/2007 | Yamamoto et al. | ......... | 382/104 |
| 7,295,925 B2 * | 11/2007 | Breed et al. | ................ | 701/301 |

* cited by examiner

*Primary Examiner*—Richard M. Camby
(74) *Attorney, Agent, or Firm*—Brinks Hofer Gilson & Lione

(57) ABSTRACT

The disclosure relates to a lane detection system for a vehicle, having a camera for sensing the carriageway markings in front of the vehicle, and an evaluation unit for evaluating the data collected by the camera. Geometric data of known types of carriageway markings are stored in the evaluation unit, and the evaluation unit determines the type of sensed carriageway markings by comparing the sensed carriageway markings with the stored carriageway markings. The evaluation unit determines the velocity of the vehicle from the known geometric data of the sensed carriageway markings and their changes over time, which are sensed by the camera. The disclosure also relates to a method for operating a lane detection system.

11 Claims, 1 Drawing Sheet

LANE DETECTION SYSTEM AND METHOD

CROSS-REFERENCE TO RELATED APPLICATIONS

Figure 1:
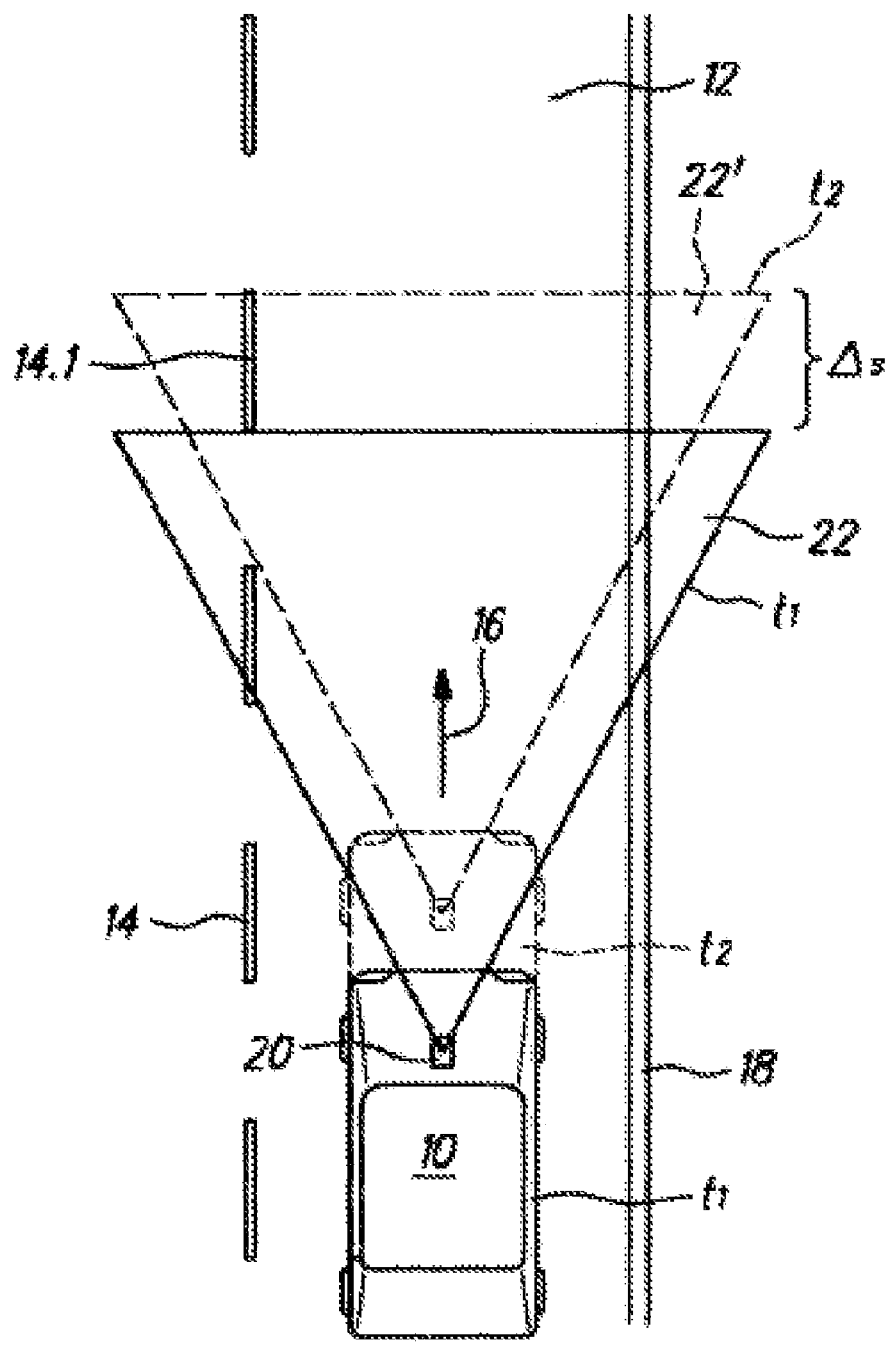

This application is a continuation of International Application No. PCT/EP2006/011131 filed on Feb. 9, 2006, which claims the benefit of German Patent Application No. 10 2005 014 114.5, filed Mar. 21, 2005. The disclosures of the above applications are incorporated herein by reference.

FIELD

The present disclosure relates to lane detection systems for vehicles.

BACKGROUND

The statements in this section merely provide background information related to the present disclosure and may not constitute prior art.

Lane detection systems are known in the art, and are frequently referred to as Lane Departure Warning Systems or Lane Changing Assist Systems. Such systems in particular detect the lines delimiting the lane, and warn the driver of inadvertently leaving the lane. Inadvertent lane changes may, for example, be the consequence of driver inattention, fatigue and/or sleep. The systems known in the art are only supposed to activate when a certain speed has been reached. In addition, the vehicle speed can be taken to calibrate the responsitivity of the system. In known vehicles, the vehicle speed is determined by other vehicle systems and conveyed to the lane detection system, for example by means of a CAN bus. Therefore, the expenditure associated with retrofitting of lane detection systems in vehicles is not negligible.

SUMMARY

The present disclosure provides a lane detection system of the type described above, so that retrofitting of the system is simplified.

This is achieved in the above mentioned lane detection system in that the evaluation unit stores geometrical data of known types of lane markings, that the evaluation unit determines the type of the sensed lane markings by comparison of the sensed markings with the stored lane markings, and that the evaluation unit determines the vehicle speed from the known geometrical data of the sensed lane markings with their temporal changes sensed by the camera.

According to the present disclosure, lane markings are thus stored from available road marking and road construction guidelines (in particular Recommendations for the Construction of Access Roads EAE 85/95; Road Marking Guidelines RMS; Road Construction Guidelines RAS). Consequently, the geometrical data of lane markings are regulated and known. Depending on the lane, there are different types of lane markings that may be used. Autobahns, federal highways, and country roads as well as city streets in part feature different geometrical data. In particular, the length, width and distance between broken centerlines can be different. In particular by knowing the length, width and/or distance of the lane markings, the evaluation unit can determine the vehicle speed by means of the temporal changes sensed by the camera.

The overall advantage of the present disclosure is that the lane detection system is operable independently of other vehicle systems. In particular, there is no need for a speed input.

The lane markings may particularly be lane lines such as broken centerlines, for example, where the length of a broken centerline and/or distance between two adjacent centerlines is known from the established type of the sensed lane markings. The vehicle speed can be determined from the known length and/or distance, and the time taken to cover this length and/or distance.

In particular, the time elapsed between a first point, at which the camera senses the start and/or end of a broken centerline, and a second point, at which the end and/or start of the same or another centerline is sensed, may be taken as a temporal change. As already mentioned, the speed of the vehicle can be derived from the known length of the centerline, the distance between two centerlines and/or several centerlines as well as the sensed temporal change.

It is advantageous when both points in time are determined in defined image planes of the camera. The defined image planes may be different image planes, where the distances of both image planes are consequently taken into account. However, it is also conceivable that both points in time are determined in the same image plane of the camera. The appearance of the start of the longitudinal centerline in the detection area of the camera can be determined as the first point, for example, and the appearance of the end of the same longitudinal centerline in the detection area of the camera as the second point. The time elapsed between the two points as well as the known length of the longitudinal centerline is then taken to determine the vehicle speed.

The type of lane markings may in particular be determined from the width of the centerline and/or the distance between the broken centerlines and/or the ratio of the length of the broken centerlines to the distances between two broken centerlines and/or from the width of the shoulder lines. As already mentioned, depending on the type of road, the different types of lane markings feature different geometrical data.

It can be particularly advantageous if the evaluation unit to determine the vehicle speed calculates the average values of several broken centerlines and/or several distances between several broken centerlines. This allows a more accurate determination of the vehicle speed.

According to the present disclosure, it is likewise advantageous if the system issues warning signals when a limit speed is exceeded and the lane inadvertently changed. As mentioned above, lane detection systems usually activate at a certain limit speed. If the currently measured vehicle speed exceeds the limit speed, the system is activated to emit warning signals.

The system according to the present disclosure advantageously only has terminals for an external power supply, and operates independently of other vehicle systems. Hence, the lane detection system according to the present disclosure may be retrofitted in already existing vehicles at comparatively low expenditure. Based on the independent determination of the vehicle speed, a connection with other vehicle systems, in particular a CAN bus, can be dispensed with.

The above mentioned object may additionally be achieved with a method to operate a lane detection system for a vehicle, by means of which the lane markings in front of the vehicle are sensed and evaluated, the vehicle speed being determined as follows:

determination of the type of the sensed lane markings and comparison of the lane markings with stored types of lane markings, and determination of the vehicle speed from the identified geometrical data of the sensed lane markings and their measured temporal changes.

The method according to the present disclosure is especially advantageous for the operation of a lane detection system according to the present disclosure.

Other advantages and advantageous embodiments may be found in the following description, in which the invention is described and explained in more detail, with reference to the exemplary embodiment presented in the FIGURE.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a top view of a vehicle in a lane.

DETAILED DESCRIPTION

The following description is merely exemplary in nature and is not intended to limit the present disclosure, application, or uses.

The FIGURE shows a top view of a vehicle 10 in a lane 12. The lane 12 shows a broken centerline 14 and a shoulder line 18 delimiting the right shoulder of lane 12 in the direction of travel 16. The vehicle 10 is shown at two points of time t1 and t2, the vehicle being depicted with solid lines at t1 and with broken lines at t2. The vehicle 10 has a lane detection system 20 according to the present disclosure comprising a camera as well as an evaluation unit. The camera senses the lane markings in front of the vehicle. The detection area of the camera is indicated with reference numeral 22 at point t1 and 22' at point t2.

Geometrical data of known types of lane markings are stored in the lane detection system. The type of lines on the lane on which the vehicle is currently moving may be derived from the centerline 14 and/or the shoulder line 18 sensed by the camera. Thus, based on the known type and known geometrical data of the lane markings, the length of the individual centerlines 14.1, as well as the distance between two adjacent centerlines, is known.

To establish the vehicle speed, the temporal changes in the individual centerlines sensed by the camera are determined. According to the FIGURE, at the time t1 the centerline 14.1 enters the detection area 22 of the lane detection system 20. As a result of the forward movement of the vehicle, the end of the centerline 14.1 is detected at time t2. The traveled distance Δs corresponds to the known length of the centerline 14.1. Based on the elapsed time Δt=t2−t1 and the traveled distance Δs, the vehicle speed v can be determined as follows:

$$v=\Delta s/\Delta t.$$

Consequently, with the lane detection system 20 according to the present disclosure, the vehicle speed may be determined independently and separately from other vehicle systems.

In the system illustrated in the FIGURE, the two points in time t1 and t2 are determined in the same image plane, namely when the centerline 14.1 enters and/or leaves the detection area 22. According to the present disclosure, the times t1 and t2 may also be determined in another image plane or in different image planes of the detection area 22.

In order to establish the vehicle speed more accurately, several broken centerlines and/or distances between several broken centerlines may advantageously be averaged.

Instead of detecting the start and end of the centerline 14, the distances between two adjacent centerlines and/or among several centerlines may be taken.

The lane detection system additionally determines whether the lane is inadvertently changed while a limit speed is exceeded. If such is the case, a warning signal will be activated. The lane detection system may be activated on the basis of the speed detected by the lane detection system according to the present disclosure and a comparison of this speed with the preset limit speed. In addition, depending on the actual speed established by the lane detection system, the responsitivity of the lane detection system can be changed.

What is claimed is:

1. A lane detection system (20) for a vehicle, with a camera to record the lane markings (14, 18) in front of the vehicle, and an evaluation unit to evaluate the data sensed by the camera, characterized in that geometrical data of known types of lane markings are stored in the evaluation unit, that the evaluation unit identifies the type of the sensed lane markings by comparison with the stored lane markings, and that the evaluation unit determines the vehicle speed (v) from the identified geometrical data (Δs) of the sensed lane markings and their temporal changes sensed by the camera (Δt).

2. The lane detection system (20) according to claim 1, characterized in that lane markings are broken centerlines (14), the length of a broken centerline (14.1) and/or distance between two adjacent centerlines being known from the identified type of the lane markings sensed as geometrical data (Δs).

3. The lane detection system (20) according to claim 1, characterized in that the time elapsed between the first point in time (t1), at which the camera senses the start and/or end of a broken centerline (14.1), and the second point in time (t2), at which the end and/or start of the same or different centerline (14.1) is sensed, is taken as the temporal change (Δt).

4. The lane detection system (20) according to claim 3, characterized in that both points in time (t1, t2) are determined in defined image planes of the camera.

5. The lane detection system (20) according to claim 3, characterized in that both points in time (t1, t2) are determined in the same image plane of the camera.

6. The lane detection system (20) according to claim 1, characterized in that the type of the lane markings are determined from the width of the centerlines (14) and/or the distances of the broken centerlines (14) and/or the ratio of the length of the broken centerlines (14) to the distances between two broken centerlines (14) and/or from the width of the shoulder line (18).

7. The lane detection system (20) according to claim 1, characterized in that to determine the vehicle speed the evaluation unit calculates the average value of several broken centerlines and/or several distances between several broken centerlines.

8. The lane detection system (20) according to claim 1, characterized in that the system (20) activates a warning signal when the limit speed is exceeded while inadvertently changing the lane.

9. The lane detection system (20) according to claim 1, characterized in that the system only features terminals for the connection of an external power supply, and its operation is otherwise independent of other vehicle systems.

10. A method to operate a lane detection system (2) for a vehicle, with which the lane markings (14, 18) in front of the vehicle may be sensed and evaluated, the vehicle speed (v) being determined as follows:
- determination of the type of the sensed lane markings by comparison of the lane markings with stored types of lane markings, and
- determination of the vehicle speed from the known geometrical data of the sensed lane markings and their measured temporal changes.

11. The method according to claim 10 to operate a lane detection system (20) for a vehicle, the lane detection system having a camera to record the lane markings (14, 18) in front of the vehicle, and an evaluation unit to evaluate the data sensed by the camera, characterized in that geometrical data of known types of lane markings are stored in the evaluation unit, that the evaluation unit identifies the type of the sensed lane markings by comparison with the stored lane markings, and that the evaluation unit determines the vehicle speed (v) from the identified geometrical data ($\Delta s$) of the sensed lane markings and their temporal changes sensed by the camera ($\Delta t$).

* * * * *